United States Patent [19]

Lado

[11] Patent Number: 5,094,177
[45] Date of Patent: Mar. 10, 1992

[54] CONCURRENT-FLOW MULTIPLE HEARTH FURNACE FOR THE INCINERATION OF SEWAGE SLUDGE FILTER-CAKE

[76] Inventor: Ernest A. Lado, 5065 NW. 66 Dr., Coral Springs, Fla. 33067

[21] Appl. No.: 678,588

[22] Filed: Apr. 1, 1991

[51] Int. Cl.⁵ ............................................. F23G 5/04
[52] U.S. Cl. ................................. 110/346; 110/225; 110/234
[58] Field of Search ............... 110/225, 346, 233, 234, 110/238

[56] References Cited

U.S. PATENT DOCUMENTS

| | | | |
|---|---|---|---|
| 2,136,451 | 11/1938 | Martin | 110/225 |
| 2,145,090 | 1/1939 | Lewers | 110/225 |
| 2,744,477 | 5/1956 | Hartley et al. | 110/225 |
| 4,483,258 | 11/1984 | John et al. | 110/225 X |

FOREIGN PATENT DOCUMENTS 0133522 10/1981 Japan ............................. 110/225

Primary Examiner—Edward G. Favors
Attorney, Agent, or Firm—Foley & Lardner

[57] ABSTRACT

An apparatus and process for the incineration of sewage sludge in a concurrent-flow multiple hearth furnace-incinerator which complies with the fundamental thermodynamic conditions required to establish a sustained and stable combustion condition. The sewage sludge is incinerated to a truly inert and odorless ash, while yielding off-gas which has been burned free of all malodorous and condensable volatiles from which trouble-free steam and in-house electric power can be commercially produced and an excess sold to the local utility company.

24 Claims, 3 Drawing Sheets

CONCURRENT-FLOW MULTIPLE HEARTH FURNACE FOR THE INCINERATION OF SEWAGE SLUDGE FILTER-CAKE

FIELD OF THE INVENTION

The present invention relates generally to multiple hearth incinerators, and more particularly is directed to an improved concurrent-flow multiple hearth furnace for the incineration of sewage sludge filter-cake.

BACKGROUND OF THE INVENTION

With an ever-increasing population and stricter standards of control in the disposal of human wastes, the disposal of sewage sludge has become a major environmental concern. It is no longer acceptable to bury the waste in landfills or to dump the waste at sea, and safe disposal environmentally is a major problem.

Incineration of sewage sludge in multiple hearth furnaces as practiced by many municipalities and industries in the U.S. and abroad remains the most acceptable form of waste disposal at the present time and in the foreseeable future. Incineration reduces the sludge to a low volume, presumably inert ash, which can be disposed of with minimal environmental concern, and purports to release off-gas to atmosphere which is inert and without offensive odor. For many years the incineration of sewage sludge has been accomplished in municipally or industrially owned multiple hearth furnaces, and this work-horse of the chemical and metallurgical industries remains the most acceptable sludge incinerator in use.

The Herreshoff multiple hearth pyrites roaster of the 1890's first was utilized to produce sulfuric acid and for recovery and purification of metals. The roaster was utilized for many other applications over the years, including mercury, lime and magnesite, nickel and cobalt, granular carbon, foundry sand, and many others. Eventually the roaster was utilized for incineration of sewage sludge. The prior art multiple hearth furnaces will be further described with respect to FIGS. 1 and 2.

The problem with these conventional incinerators is that they are operated as countercurrent flow units, where flame and heat move up and away from the sludge. This is contrary to the incinerator needs which are to evaporate moisture, to preheat and crack the dry solids, to ignite the residual carbon and keep it ignited and burning, and to reinvest heat at a rate adequate to maintain a burning condition. In addition, the conventional countercurrent sludge incinerator is characterized by its unstable operation and by cyclic fluctuations in its performance, including frequent runaway top hearth and off-gas temperatures, which require excessive and stressful operator attention.

The high temperature developed by the burning of combustible volatiles is critically needed for ignition of the residual carbon and for sustained combustion to a truly inert ash. This applies as well to any supplementary fuel burned, the heat from which flows up and out with the off-gas from the top hearth having done but limited useful work. The severe heat loss with the off-gas is attested by its frequent runaway temperatures which threaten the integrity of the off-gas system including ducts, fans and dampers, stack, etc. This is particularly true in systems which do not have a scrubber system which obviously provides protection by quenching the hot gases.

The runaway off-gas temperature is generally countered by the operator with a cutback in supplementary fuel used, which momentarily improves the off-gas temperature condition, but which is soon followed by a temperature drop in the burning zone, and the appearance of nodes of wet sludge with the ash. To dry and burn the nodes of wet sludge, the operator is forced to again increase the burning of supplementary fuel, which soon restores the runaway off-gas temperature condition which started the cycle. This is a repetitive and vicious circle and a perpetual and uncontrollable balancing act which occurs several times during any 8-hour shift and which may well contribute to job-induced operator stress.

Further, the off-gas of a countercurrent flow incinerator sweeping as it does over wet sludge just prior to its discharge from the top hearth is not the inert gas it is purported to be, but is loaded with malodorous constituents which represent an environmental and public relations problem, and condensable volatiles which are inimical to the trouble-free production of steam. Finally, if considering the sludge incinerator as a burner, which it is, it is unique in that it is the only countercurrent flow burner in existence. The pre-mix and nozzle-mix gas burners, the air-atomizing and pressure atomizing oil burners, and the powdered coal burners are all concurrent flow burners, where fuel and air mix and burn to completion together in fractional seconds, and unlike the countercurrent sludge incinerators are characterized by their steady and stable operation, requiring minimal operator attention. These negative considerations of the conventional sludge incinerators are all associated with and due to the countercurrent flow design.

It would be desirable to provide a concurrent flow sludge incinerator, to control odor, to produce trouble free steam and to generate electric power, which power can be utilized or sold if generated in excess of local needs.

OBJECTS AND SUMMARY OF THE INVENTION

It is, therefore, a primary object of the present invention to provide an improved concurrent flow multiple hearth sludge incinerator.

A further object of the present invention is to provide improved-odor control in a concurrent flow multiple hearth sludge incinerator.

It is yet another object of the present invention to provide a concurrent flow multiple hearth sludge incinerator which is energy efficient and which produces trouble free steam for electric power generation.

In general, the present invention contemplates a concurrent flow multiple hearth sludge incinerator having a plurality of hearths where the sludge and carbon is completely burned. Combustion air is inlet and controlled at the top hearth and the exhaust gases are outlet at the bottom hearth into a waste heat boiler to generate steam for power usage. The exhaust from the waste heat boiler is input into a precipitator to eliminate exhaust particles.

These and other features and advantages of the invention will be more readily apparent upon reading the following description of a preferred exemplified embodiment of the invention and upon reference to the accompanying drawings wherein:

Figure 1:
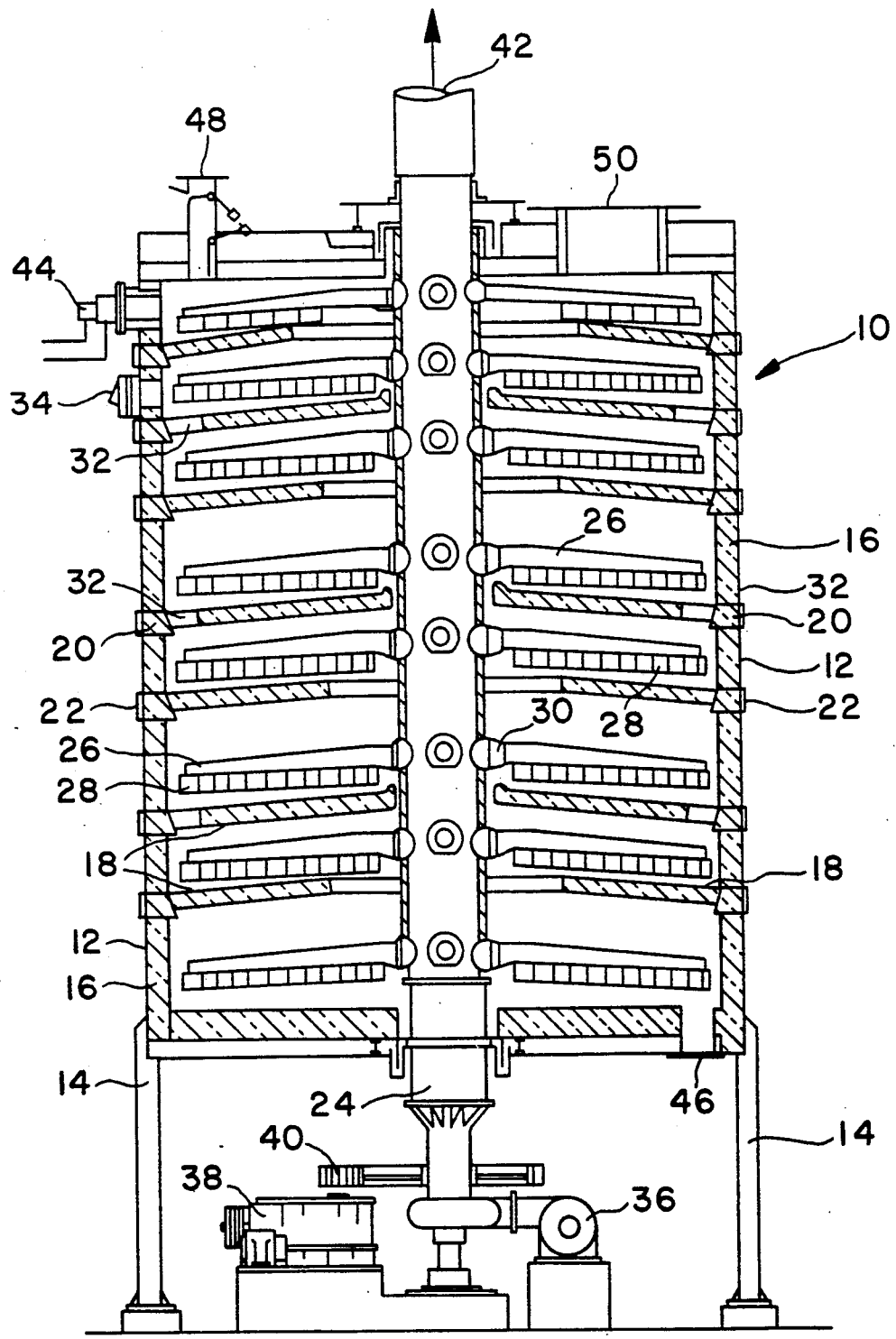
FIG. 1 is a cross-sectional view of a prior art multiple hearth furnace.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Turning to the drawings, a prior art multiple hearth furnace 10 includes a vertical cylindrical steel shell 12 supported on a plurality of structural steel columns 14. The shell 12 has an interior wall 16 lined with fire-brick, insulating fire-brick, and other refractory materials and includes a varying number of superimposed refractory hearths 18 stacked vertically at spacings in the order of two (2) to five (5) feet or more depending on the application of the furnace 10.

The number of hearths 18 varies and typically has ranged from a minimum of four to a maximum of seventeen. The hearths 18 are supported by a refractory skew-back 20 at the shell 12, which is reinforced by a steel skew-band 22. The skew-band 22 completely encircles the shell 12 and is designed to take the full outward thrust produced by the weight of the hearth refractories 18 including the additional charge or burden.

A double-wall air-cooled cast nodular iron or alloy center shaft 24 is mounted to rotate slowly about its vertical axis. The shaft 24 carries a number of attached air-cooled rabble arms 26, each equipped with a set of removable alloy rabble teeth or plows 28. The teeth 28 rabble the furnace charge upon the stationary hearths 18 causing the charge to flow spirally in toward a large central drop-hole 30, or spirally out toward a multiplicity of smaller drop-holes 32 along the periphery of the furnace 10.

The hearths 18 are appropriately designated as in-hearths or as out-hearths depending on the direction of flow of the charge or burden. The multiple hearth furnaces 10 also are equipped with at least one work-door 34 per hearth 18. Each of the work-doors 34 is equipped with an observation port to provide for inspection and replacement of worn parts and for rearrangement of rabbling patterns, etc. The center shaft 24 and the rabble arms 26 are air-cooled, the air supplied by a center shaft cooling air fan or blower 36. The entire rabbling assembly is driven by a center shaft motor and speed reducer 38 through a spur gear and pinion 40 at a speed generally in the range of one to three RPM with capability for a speed change.

The center shaft cooling air is generally discharged at an open end 42 to atmosphere at a temperature of about 300° F. as a waste product. The multiple hearth furnaces 10 conventionally are equipped with a plurality of shell mounted burners 44. The burners 44 are fired utilizing either natural gas or a liquid fuel to provide the process heat required for the specific application. The burners 44 usually are equipped with gas pilots to ensure continuity of the combustion process and the burners 44 fire horizontally and quasi tangentially into the space available between the hearths 18.

The conventional sewage sludge incinerators 10 now in existence are all countercurrent flow units in that the off-gas flows up and out from the top hearth, while the sludge flows down from the top hearth and out as ash from the bottom hearth 18 through an opening 46.

Process-wise the sequential steps of the conventional countercurrent flow sewage sludge incinerator 10 involves:

1. Feed the wet sludge into the top hearth 18' such as through an opening 48.
2. Preheat the wet sludge to wet bulb temperature of the furnace gas.
3. Evaporate all the free water at this temperature.
4. Heat the dry solids to their cracking temperature, about 800° F.
5. Crack the dry solids at 800° F. and burn the volatiles.
6. Burn-off all the residual carbon to an inert residue.
7. Discharge the "inert" ash from the bottom hearth 18 through the opening 46.
8. Discharge all the gases from the top hearth 18' through a top controlled opening 50.

The steps 2 through 6 all require transfer of heat from furnace gases and the furnace walls to the furnace charge or burden. This includes all sensible heat to heat the moisture and dry the solids, and the latent heat of evaporation to vaporize the free water. Steps 5 and 6 release heat by combustion of the volatiles and the residual carbon. All of these operations are governed by the laws of heat transfer.

Theoretical Consideration

The transfer of heat is governed by the following equation:

$$Q = (U)(A)\,t$$

where $Q$ = Rate of Heat Transfer
$U$ = Overall Coefficient of heat transfer
$A$ = Heat transfer area
$\Delta t$ = Temperature difference between hearth gas and bed Q represents the amount of work done by a hearth per unit of time. U, the overall coefficient is a natural phenomenon over which the thermal engineer has no control. As a rule of thumb, its value is approximately the gas phase temperature (° F.) divided by 100. Thus, for a hearth operating at 1400° F. the numerical value of U is 14 BTU/HR/ft$^2$/° F. A, the area of heat transfer is the effective hearth area, which does not include the area of the drop holes, nor the area between drop holes of an out-hearth. $\Delta t$ is the driving force which causes heat to flow from a hotter to a colder body and the rate of heat flow is directly proportional to its numerical value.

In the combustion process, combustibles such as wood, paper, dry sludge solids, plastics, and all organic compounds can be mixed with air and will not burn until heated with a match, a torch, or other ignitor to the minimum ignition temperature of the system. The combustibles will continue to burn only as long as more than 50% of the heat released by the combustion process is reinvested in the system. If less than 50% of the heat released is reinvested in the process a BTU deficit develops, and the combustion process is extinguished.

The MIT of a system is that temperature at which the system will ignite and remain ignited and burning after the ignitor has been withdrawn. Some typical MIT's are:

| | |
|---|---|
| Benzene: | 1026° F. |
| Methane: | 1170° F. |
| Carbon monoxide: | 1128° F. |
| 92 Octane gasoline: | 724° F. |
| Carbon: | 1200+° F. |

Wood, paper, dry sludge solids, etc., crack at 700°-800° F. into combustible volatiles and residual carbon. The volatiles burn quickly and well, but carbon must be made to burn by providing it with an ambient temperature greater than its MIT of 1200+° F.

As indicated, the combustion process will cease if the rate of heat transfer back into the system becomes smaller than the rate of heat loss from the burning system. The process of combustion will not tolerate a BTU deficit; heat must be reinvested at a rate greater than the rate of heat loss. This is why a burning match about to flame-out with its tip up will resume vigorous burning when reversed to a tip-down position. The rate of heat reinvestment in the process becomes greater than the rate of heat loss when the flame was going out, and the combustion process is restored.

The cracking of dry solids in an incinerator starts when the sludge filter-cake has been partially dried and heated to a temperature approaching 800° F. Cracking breaks up the dry solids into combustible volatiles which burn quickly, and residual carbon, which must be burned so its heating value becomes available to the process. The residual carbon must be burned, because its heating value is required in the process of incineration. Any unburned residual carbon represents a heat loss in a process that must effectively use all of the heat available.

Once started, the cracking of solids and burning of volatiles becomes a brisk autogenous process which is over quickly. The volatiles are burned to completion before the residual carbon is properly ignited and burning. In the prior art countercurrent multiple hearth sludge incinerator 10, most of the heat released by the combustion of volatiles flows quickly up and out of the system as sensible heat with the off-gas from the top hearth having done very limited useful work. Troublesome runaway top hearth and off-gas temperatures also result. This leaves behind an "unfinished" ash which contains wet "sludge-balls" heavily coated with insulating ash, plus residual carbon not yet adequately ignited and burning.

Applicant's "typical" heat and mass balance model yield 0.354 pounds of residual carbon per one pound of dry solids after the upward evolution and burning of the volatiles over wet, non-ignitable sludge. This carbon has a heating value of 5000 BTU or seventy percent of the original heating value of the sludge solids. This is valuable and necessary heat provided the carbon can be burned. However, with the bulk of the heat from the volatiles exhausted with the off-gas, and the carbon not yet adequately ignited, the temperature drops sharply limiting the system's capability to maintain a required carbon ignition temperature (1200+° F.) and a carbon combustion condition by an adequate transfer of heat back into the system.

The basic problem is that with volatiles' heat exhausted, the temperature is too low to ignite the carbon, and will remain too low unless the carbon is ignited and burned to completion. A vicious circle, and the fundamental reason why large amounts of supplementary fuel must be burned in the conventional countercurrent multiple hearth incinerator 10. For obvious reasons of economy, the supplementary fuel utilized is never enough to fully make up for heat losses, and the operation is erratic and unstable.

Figure 2:
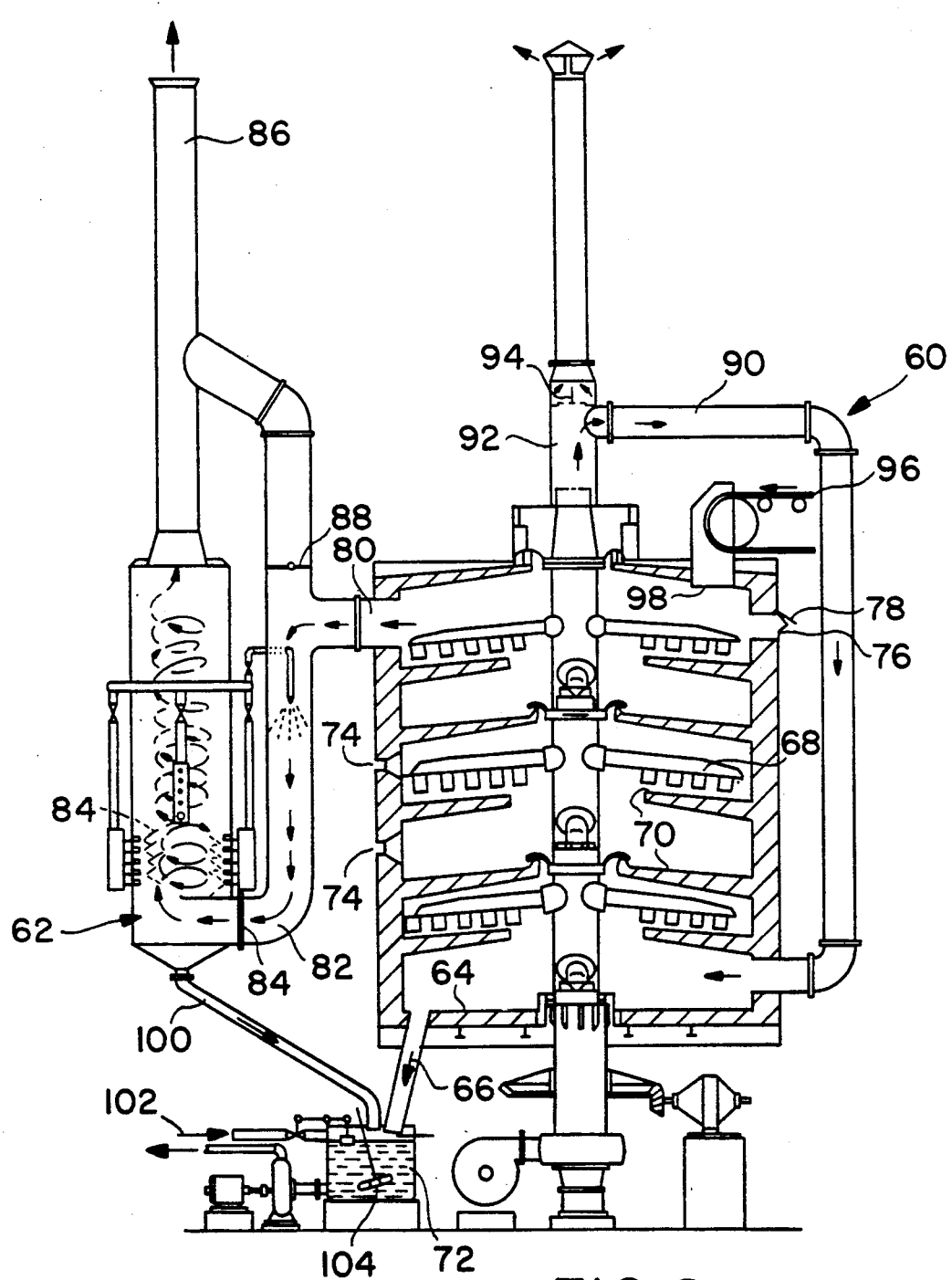
FIG. 2 is a cross-sectional view of a prior art multiple hearth furnace for sludge incineration.

Referring to FIG. 2, incineration of sewage sludge in a prior art 6-hearth Nichols Herreshoff type furnace 60 is combined with a Nerco-Arco cyclonic jet scrubber 62 as a system for the incineration of sewage sludge. The multiple hearth furnace 60 generally follows the designs described with respect to FIG. 1 and is based on the conventional countercurrent-flow operation. In this operation, heat and gases flow up, and countercurrent to the downward flow of sludge, which eventually is discharged as an imperfect ash from a bottom hearth 64 of the incinerator 60 through an opening 66.

The furnace 60 is equipped with two rabble arms 68 at each hearth 70. The arms 68 are set at an angle of ninety degrees on a horizontal plane on alternate hearths 70. The arms 68 rabble the sludge from hearth 70 to hearth 70, eventually moving the sludge from the top to the bottom hearth 64 as the sludge is dried and cracked with burning of volatiles. The residual carbon then is burned, ideally to an inert ash, which in this example is quenched in a water bath 72 and pumped to an ash pond or other disposal area.

In other typical applications, the quasi-inert ash is cooled and conveyed to a holding tank and then hauled by truck to an ash disposal site. The furnace 60 illustrated was equipped with four burners 74 on each of the bottom three hearths 70. The burners 74 burn a supplementary fuel such as natural gas, in dual flow premix or nozzle mix gas burners in which fuel and air are mixed and burned to completion together in a fraction of a second.

This prior art furnace 60 also was equipped with two work doors 76 per hearth 70, each equipped with an observation port 78. The ports 78 allow for inspection and evaluation of needed repairs or replacement of rabble teeth, arms, etc. or of any modification of the rabbling pattern. The arrangement 60 depicted in FIG. 2 and in all the prior art multiple hearth incinerators operates such that the hot gases flow up and discharge from the top hearth 70 through an opening 80. In this example the opening 80 is coupled by a duct 82 down into a bottom inlet 84 of the Nerco-Arco Cyclonic Jet Scrubber 62. The gases are scrubbed by a profusion of water sprays 84 while flowing spirally up through the scrubber 62 and eventually out an opening on stack 86 to atmosphere, again as waste gases. In the event of a power or water failure a by-pass damper 88 is opened directly to the stack 86 and hence directly to atmosphere.

The furnace 60 also includes a duct connection 90 from a center shaft cooling air vent 92 down to the bottom hearth 64. A floating damper 94 in the cooling air vent 92 produces a back pressure which forces all or part of the heated air to flow down and into the bottom hearth 64 and up through the furnace 60 in flow which is countercurrent to the downward flow of sludge and ash. The center shaft air has a temperature of about 300° F. and has been referred to as shaft cooling air. If this was the only function of the warm air recycle, it would have been better to utilize ambient air at about 70° F. It can be concluded that this warm air recycle was intended as a heat recovery device which failed to produce the desired economy, because of the countercurrent mode of operation.

Wet sludge filter cake (not illustrated) is fed by a belt conveyor 96 and dropped into the top hearth 70 via a hooded feed inlet 98. The ash is discharged quasi continuously into the stirred water-quench tank or bath 72. The bath 72 also receives ash slurry from the scrubber 62 via a pipe 100 and make up water 102 as needed to maintain a constant level within the quench tank 72. The ash slurry is pumped to an ash pond (not illustrated) at a rate such that the solids content in the quench tank 72 is in the range of 20-30% solids. To prevent decantation of solids within the quench tank 72, the tank 72 is equipped with an agitator 104 to maintain the solids in suspension.

The incinerator 60 represents the prior operation in which the hot off-gas is discharged from the top hearth and flows through a scrubber or other dust and fume control device or through a waste heat boiler for recovery of steam and generation of power. Scrubbing is effective for collection of dust and of fumes which are wettable, but is not effective for control of odors or of condensable volatiles, which can best be controlled by burning at temperatures in the range of 1250°-1300° F. in the presence of excess oxygen.

The conventional prior art multiple hearth sewage sludge incinerator 60 and all sludge incinerators in service at the present time are countercurrent-flow furnaces. In this operation gas combustion products and the heat released by the combustion process flow up and countercurrent to the flow of the downward moving sludge and ash. Both streams move away from each other and from the burning process. This mode of operation runs counter to the fundamental law of the combustion process.

The fundamental law governing any combustion process is that more than 50% of the heat released when burning must be reinvested in the system for the combustion process to continue. If more than 50% of the total heat released is lost or dissipated, a BTU deficit exists, and the combustion process terminates. The upflow countercurrent-flow sewage sludge incinerator 60 is in violation of this fundamental law by allowing needed combustion heat to be dissipated and lost with the off-gas from the top hearth. The combustion heat should be retained in concurrent flow with the sludge and forced to do the useful work of evaporation of moisture, preheating of the dry solids to a cracking temperature and supplying the heat required for cracking.

The prior art dissipated and lost heat is more than 50% of the total heat released, and the fires would go out if not for the substantial use of expensive supplementary fuel to make up for the heat loss. The supplementary fuel use, for reasons of economy is held well below what is really required to fully make up for the heat loss.

The prior art countercurrent-flow incinerators thus have the following problems:
1. Heavy use of expensive supplementary fuel.
2. Unstable operation requiring excessive and stressful operator hours.
3. Foul odors are picked up by off-gas sweeping over the sludge introduced.
4. Condensable volatiles are picked up by the off-gas sweeping over the unburned sludge.
5. The scrubber 62 forfeits any chance for production of steam.
6. The resultant odors pose a severe environmental and public relations problem.
7. The scale forming condensable volatiles are inimical to the trouble free production of steam.
8. The unburned carbon represents a heat loss and partly unburned sludge result in a septic and unsanitary ash which is a potential health hazard.

Figure 3:
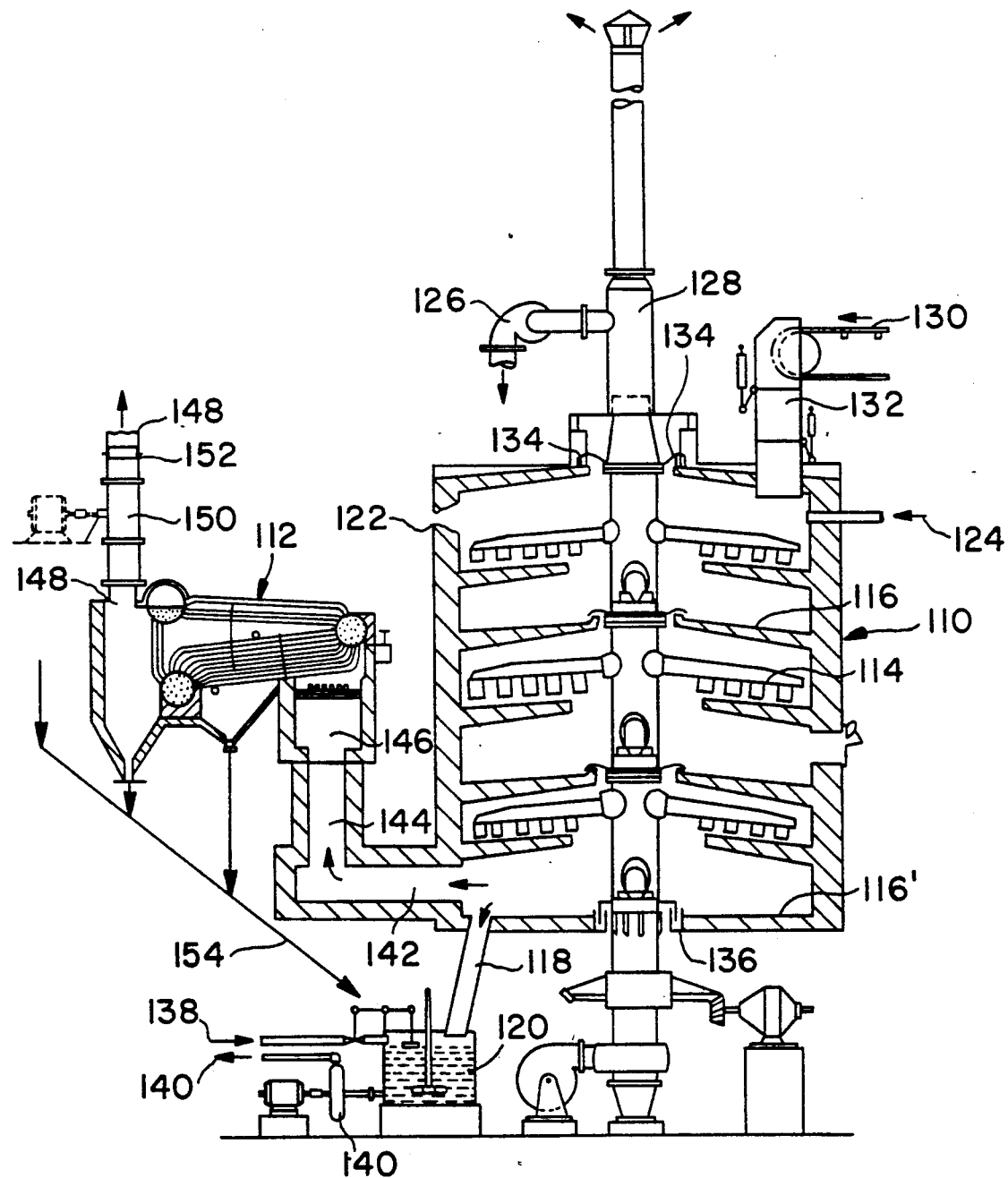
FIG. 3 is a cross-sectional view of one embodiment of the present invention.

Referring to FIG. 3, one embodiment of a concurrent-flow multiple hearth sewage sludge incinerator 110 is illustrated. The incinerator 110 includes a three drum waste heat boiler 112 for the incineration of sewage sludge with provision for recovery of the waste heat as steam for generation of in-house electrical power and for commercial sale of excess power to the local utility.

The incinerator 110 generally follows the overall design of the prior art furnaces 10 and 60, but most importantly is based on a concurrent-flow design and operation. The incinerator 110 provides an environmentally sound and acceptable process for effective incineration of sewage sludge.

The three drum waste heat boiler 112 represents a design, which has been utilized successfully for many years in the recovery of waste heat from ore roasting operations, generally associated with moderate to heavy entrainment of roaster dusts.

The multiple hearth incinerator 110 is equipped for concurrent flow of gaseous combustion products and heat released on one hand and the normal downward flow of sludge and ash on the other. Both streams will move down in concurrent flow thus forcing the heated gas stream and the heat released to do maximum work in the vaporization of moisture, in the preheating of the dry solids to their cracking temperature, and in the furnishing of heat required for the cracking process.

The concurrent-flow sludge incinerator 110 thus complies with the fundamental heat reinvestment law of the combustion process. Additionally, the furnace 110 is equipped with two rabble arms 114 per hearth 116. The arms 114 are set 90° apart from hearth to hearth. The arms 114 rabble the sludge from hearth to hearth as it is progressively dried, preheated, cracked, and reduced to a truly inert ash eventually discharging from a bottom hearth 116' through an opening 118 and into a quench tank 120. The furnace 110 is equipped with four shell mounted burners 122 on the top hearth 116 located 90° apart along the periphery. The burners 122 fire quasi-tangentially into the available hearth spacing with all burners equipped with constant gas pilots, and with the total firing rate automatically controlled by a temperature recorder and automatic gas rate controller (not illustrated). The burners 122 will burn a gaseous supplementary fuel and their use will be for ignition and pilot service to ensure uninterrupted flame in the burning zone plus limited additional use for temperature control purposes.

The top hearth also is equipped with four incineration air nozzles 124 for injection of preheated center shaft cooling air into the top hearth. These nozzles will be shell mounted 90° apart and located between the gas burners 122, firing also quasi-tangentially into the available hearth space and preferably are equipped with manual balancing dampers requiring no further control.

An incineration air blower 126 will be mounted on a steel center shaft 128 to supply preheated air from the center shaft cooling air for incineration of the sludge solids, with adequate capacity to provide a prudent excess over theoretical requirements. The suction side of the blower 126 is connected to the center shaft vent and draws whatever air volume is required for incineration of the sludge plus any excess deemed necessary. The discharge side of the incineration air blower 126 preferably is equipped with provision for volume measurement and remote manual control with temperature corrected volume readout in the control room. The discharge also preferably will be manifolded or connected to the four incineration air nozzles 124 on the top hearth, which once balanced will require no further adjustment.

Wet filter cake (not illustrated) is furnished by a belt conveyor 130 discharging into a hydraulically or electrically operated double flap seal valve 132, which allows for essentially continuous feeding into the incinerator 110 without outleakage of furnace gases. The concurrent-flow incinerator 110 also is equipped with a multipoint temperature recorder-controller (not illustrated) for recording/controlling of temperatures on all hearths 116, the CSCA temperature, boiler inlet and outlet temperatures, plus spares to be assigned.

The incinerator furnace 110 is equipped with effective water seals around the center shaft 128 at the top 134 and at the bottom 136. The seals 134, 136 provide for effective sealing against pressure surges and is to be supplied by perpetual running water. A truly inert ash is discharged from the bottom hearth 116' directly into the water-quench tank 120. The tank 120 includes provision for automatic water level make-up and a centrifugal ash pump 140 for the transfer of ash slurry to a captive ash pond. Alternately, the ash may be cooled and transported to a holding tank and occasionally transported by a dump truck to an ash disposal site.

The off-gas from a refractory-lined off-gas breaching 142 in the bottom hearth 116' will flow up through a refractory-lined vertical riser 144 to a high temperature inlet 146 of the waste heat boiler 112. The off-gas flows through the boiler 112 and out from a low temperature outlet 148 from the boiler 112 at a temperature of about 500° F. All gas flows are induced by a draft fan 150 and automatically controlled by a control damper 152 preferably with remote control from the control room.

The low temperature off-gas beyond the fan 150 and the damper 152 is directed to an electrostatic precipitator (not illustrated) for effective removal of essentially all dust entrained with the off-gas. Dust recovered by the boiler 112 and by the electrostatic precipitator will be returned as one stream 154 to the quench tank 120 or to any optional ash disposal system.

The incinerator 110 utilizes a concurrent flow multiple hearth furnace for major and unprecedented improvements in the incineration of sewage sludge. As a combustion model, a wooden kitchen match can be utilized. In the case of a match with its tip up, flame and heat move up and away from the fuel (wood) and the flame dies out. In a countercurrent incinerator, flame and heat move up and away from the fuel (sludge) and the fires go out if no supplementary fuel is burned to prevent it. In the case of a match with its tip down, flame and heat move up with the fuel (wood) to promote vigorous burning. The reason an uptipped match will not burn in countercurrent flow is that the two countercurrent streams flowing away from each other and from the burning process have only the match cross-sectional area at the burn line available as their interface for transfer of flame heat above the burn line to the match below the burn line. This small area is grossly inadequate to transfer more than 50 percent of the total heat released, as required to achieve a sustained burning condition. As a result, a BTU deficit develops, and the countercurrent match flames out. Thus, a match cannot burn in countercurrent flow because its heat transfer area at the burn line is too small to transfer greater than 50% of the total heat released from flame above the burn line to the match below the burn line.

This principle applies as well to the burning of sewage sludge in countercurrent flow, but its effect is more because 2.6 pounds of water must be evaporated by every pound of dry solids burned, and this can be accomplished only with stringently efficient use of all available heat, and will not tolerate the severe loss with the off-gas of the prior art countercurrent incinerator. In the concurrent incinerator 110 of the present invention flame and heat are forced to move down with the fuel (sludge) to promote vigorous burning without the need to burn substantial amounts of supplementary fuel.

The key is that flame and heat must move concurrently with the fuel to promote vigorous burning. The high gas phase temperature provides the ignition temperature required to ignite carbon, and the high $\Delta t$ provides the driving force which is essential to drive heat back into the system at a rate that never drops below 50% of the total heat released by the burning system.

The concurrent flow of gas, heat and sludge of the present invention provides a maximum opportunity for heat reinvestment in the combustion process, to thereby comply with the fundamental law governing the process of combustion whereby more than 50% of the heat released must be reinvested to achieve the burning condition. This results in stable combustion at a steady-state burning condition, which does not require the use of supplementary fuel to make up for heat losses sustained with the off-gas resulting from countercurrent operation. The improved results are:

1. Stable steady-state sludge incinerator operation.
2. No supplementary fuel needed to make up for heat losses.
3. No runaway top hearth and off-gas temperatures.
4. No excess operator involvement.
5. Sludge burned to a substantially inert ash.
6. Off-gas burned substantially free of foul odors.
7. Off-gas burned substantially free of condensables.
8. Substantially trouble-free production of steam and in-house power.
9. Profitable sale of excess power to local utility.
10. An end to environmental problems due to foul odors.
11. Substantially all residual carbon burned to completion without substantial lost heat.
12. Concurrent flow gases will pick up foul odors and condensable volatiles, but their flow through the built-in after-burner formed by the bottom hearths at 1300° F. or controllably higher temperature in the presence of excess oxygen insures their total destruction by fire and conversion to $CO_2$ and $H_2O$ vapor. The concurrent sewage sludge incinerator 110 provides about 7 seconds retention time for burn-out of all malodorous and condensable volatiles at a temperature of 1300° F. and an oxygen content of 2.4% with the additional insurance that moderate amounts of additional supplementary fuel will yield higher after-burner temperatures with 85% recovery of the additional fuel as trouble-free steam and in-house power. In addition, a controllably higher oxygen content can be achieved in the after-burner by use of more than 25% excess air for combustion of both sludge solids and supplementary fuel.

13. The concurrent incinerator 110 burning 36,000 pounds/hour of sludge at 27.7% solids, (72.3% water) using no supplementary fuel will yield after-burner temperatures of 1256° F. and 18,300 pounds/hour of steam. However, should 1256° F. not be hot enough to completely burn out all odors, the use of 100 pounds/hour of supplementary fuel will increase after-burner temperature to 1302° F. and produce 19,940 pounds/hour of steam. This means that after-burner temperatures can be controllably increased by a small amount of supplementary fuel, while 85% of its heating value is recoverable in the form of additional steam.

14. A small amount of supplementary fuel will always be burned in the top hearth for pilot and ignition purposes to ensure flame at all times and prevent the accumulation of unburned combustibles which could develop into an explosive condition.

15. The non-concurrent-flow prior art incinerator easily can be converted to this mode of operation.

I claim as my invention:

1. An improved method for incineration of sewage sludge in a multiple hearth incinerator, comprising:
   flowing the sludge to be incinerated through the incinerator in the first flow path; and
   igniting and maintaining the combustion of said sludge by flowing the combustion gases in a concurrent flow path with said first flow path to provide the preheating and evaporation of water present in said sludge, preheating and cracking solids present in said sludge and for providing a substantially complete combustion of residual carbon produced from said sludge, including sustaining and reinvesting greater than fifty percent of the combustion heat into said combustion process.

2. The method of claim wherein said combustion gases generate temperatures greater than 1250° F.

3. The method of claim 1 including firing supplemental fuel into a top hearth of said incinerator for only pilot and ignition purposes.

4. The method of claim 1 including exhausting said combustion gases through an after burner zone for eliminating sludge odors and condensable volatiles.

5. The method of claim 4 including flowing the sludge and combustion gases from the top hearth of the incinerator out through the bottom hearth.

6. The method of claim 4 including adding combustion air into said top hearth for providing excess oxygen for the combustion process.

7. The method of claim 6 including adding on the order of twenty-five percent excess air.

8. The method of claim 4 including coupling said exhaust gases from said after burner zone to a waste heat boiler.

9. The method of claim 8 including forming a combustion temperature in said after burner zone in excess of about 1250° F. for substantially totally converting malodorous and condensable volatiles into water vapor and carbon dioxide.

10. The method of claim 8 including producing steam and generating electric power from said waste heat boiler.

11. The method of claim 1 wherein said combustion gases generate temperatures greater than 1250° F. and including sustaining and reinvesting greater than fifty percent of the combustion heat into said combustion process, firing supplemental fuel into a top hearth of said incinerator only for pilot and ignition purposes, exhausting said combustion gases through an after burner zone to eliminate sludge odors and condensable volatiles, flowing the sludge and combustion gases from the top hearth of the incinerator out through the bottom hearth, and adding combustion air into said top hearth to provide excess oxygen for the combustion process.

12. The method of claim 11 including coupling said exhausting gases from said after burner zone to a waste heat boiler and producing steam and generating electric power from said waste heat boiler.

13. An improved multiple hearth sewage sludge incinerator, comprising:
   means for flowing the sludge to be incinerated through the incinerator in a first flow path; and
   means for igniting and maintaining the combustion of said sludge including means for flowing the combustion gases in a concurrent flow path with said first flow path for providing the preheating and evaporation of water present in said sludge, preheating and cracking solids present in said sludge and for providing a substantially complete combustion of residual carbon produced from said sludge, including means for sustaining and reinvesting greater than fifty percent of the combustion heat into said combustion process.

14. The incinerator of claim 13 including means for generating combustion gases temperatures greater than 1250° F.

15. The incinerator of claim 13 including means for firing supplemental fuel into a top hearth of said incinerator for only pilot and ignition purposes.

16. The incinerator of claim 13 including means for exhausting said combustion gases through an after burner zone for eliminating sludge odors and condensable volatiles.

17. The incinerator of claim 16 including means for flowing the sludge and combustion gases from the top hearth of the incinerator out through the bottom hearth.

18. The incinerator of claim 16 including means for adding combustion air into said top hearth for providing excess oxygen for the combustion process.

19. The incinerator of claim 18 including means for adding on the order of twenty-five percent excess air.

20. The incinerator of claim 16 including means for coupling said exhaust gases from said after burner zone to a waste heat boiler.

21. The incinerator of claim 20 including means for forming a combustion temperature in said after burner zone in excess of about 1250° F. for substantially totally converting malodorous and condensable volatiles into water vapor and carbon dioxide.

22. The incinerator of claim 20 including means for producing steam and generating electric power from said waste heat boiler.

23. The incinerator of claim 13 including means for generating combustion gases temperatures greater than 1250° F.;
   means for sustaining and reinvesting greater than fifty percent of the combustion heat into said combustion process;

means for firing supplemental fuel into a top hearth of said incinerator for only pilot and ignition purposes;

means for exhausting said combustion gases through an after burner zone for eliminating sludge odors and condensable volatiles;

means for flowing the sludge and combustion gases from the top hearth of the incinerator out through the bottom hearth; and means for adding combustion air into said top hearth for providing excess oxygen for the combustion process.

24. The incinerator of claim 23 including means for coupling said exhaust gases from said after burner zone to a waste heat boiler; and means for producing steam and generating electric power from said waste heat boiler.

* * * * *